United States Patent
Nakashima

(10) Patent No.: US 10,549,368 B2
(45) Date of Patent: Feb. 4, 2020

(54) ELECTRICAL DISCHARGE MACHINE AND FAILURE DETERMINING METHOD

(71) Applicant: FANUC CORPORATION, Yamanashi (JP)

(72) Inventor: Yasuo Nakashima, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 136 days.

(21) Appl. No.: 15/649,574

(22) Filed: Jul. 13, 2017

(65) Prior Publication Data
US 2018/0015557 A1   Jan. 18, 2018

(30) Foreign Application Priority Data

Jul. 14, 2016 (JP) .................................. 2016-139231

(51) Int. Cl.
*B23H 7/14* (2006.01)
*B23H 7/20* (2006.01)

(52) U.S. Cl.
CPC .................. *B23H 7/14* (2013.01); *B23H 7/20* (2013.01)

(58) Field of Classification Search
CPC .......... B23H 11/00; B23H 1/02; B23H 1/026; B23H 7/14; B23H 7/20; G05B 2219/45043; G05B 23/0218; G05B 23/45221
USPC .................. 219/69.13, 69.18, 69.19; 700/162
See application file for complete search history.

(56) References Cited

U.S. PATENT DOCUMENTS

| | | | |
|---|---|---|---|
| 6,130,395 A | 10/2000 | Kaneko et al. | |
| 2002/0002417 A1* | 1/2002 | Irie | B23H 7/065 700/162 |
| 2002/0043518 A1 | 4/2002 | Murai et al. | |
| 2007/0027570 A1 | 2/2007 | Buhler et al. | |
| 2008/0320471 A1* | 12/2008 | Maeda | G05B 19/406 717/178 |

(Continued)

FOREIGN PATENT DOCUMENTS

| | | |
|---|---|---|
| CN | 102470469 A | 5/2012 |
| CN | 103476529 A | 12/2013 |
| JP | H1-295719 A | 11/1989 |

(Continued)

OTHER PUBLICATIONS

Extended European Search Report in EP Application No. 17001183.7 dated Nov. 20, 2017, 8 pp.

*Primary Examiner* — Dana Ross
*Assistant Examiner* — James F Sims, III
(74) *Attorney, Agent, or Firm* — Hauptman Ham, LLP

(57) ABSTRACT

An electrical discharge machine includes: a machining power supply having a plurality of different circuit states, and configured to be capable of being set to one circuit state of the plurality of circuit states by switching at least one of electrical connection and electrical setting; a state determining unit configured to, when each of the plurality of circuit states is set as the circuit state of the machining power supply, determine whether or not the set circuit state is normal; a failure portion specifying unit configured to specify a failure portion of the machining power supply based on a determination result with respect to each of the plurality of circuit states obtained by the state determining unit; and a reporting unit (a display unit or the like) configured to report the failure portion specified by the failure portion specifying unit to an operator.

11 Claims, 11 Drawing Sheets

(56) References Cited

U.S. PATENT DOCUMENTS

2011/0209021 A1  8/2011  Sorensen et al.
2014/0014624 A1  1/2014  Yoshida et al.

FOREIGN PATENT DOCUMENTS

| JP | 2002066843 A | 3/2002 |
| JP | 2007-38396 A | 2/2007 |
| JP | 2008-296314 A | 12/2008 |
| JP | 2015037813 A | 2/2015 |

* cited by examiner

FIG. 2

| | CIRCUIT STATE 1 | CIRCUIT STATE 2 | CIRCUIT STATE 3 | CIRCUIT STATE 4 |
|---|---|---|---|---|
| RELAY RL1 | CLOSE | OPEN | CLOSE | OPEN |
| RELAY RL2 | OPEN | CLOSE | OPEN | CLOSE |
| RELAY RL3 | CLOSE | CLOSE | OPEN | OPEN |
| RELAY RL4 | OPEN | OPEN | CLOSE | CLOSE |

FIG. 4A

| NORMALITY/ABNORMALITY RESULT | CIRCUIT STATE 1 | CIRCUIT STATE 2 | CIRCUIT STATE 3 | CIRCUIT STATE 4 |
|---|---|---|---|---|
| | ABNORMAL | ABNORMAL | NORMAL | NORMAL |

FIG. 4B

| NORMALITY/ABNORMALITY RESULT | CIRCUIT STATE 1 | CIRCUIT STATE 2 | CIRCUIT STATE 3 | CIRCUIT STATE 4 |
|---|---|---|---|---|
| | NORMAL | NORMAL | ABNORMAL | ABNORMAL |

FIG. 4C

| NORMALITY/ABNORMALITY RESULT | CIRCUIT STATE 1 | CIRCUIT STATE 2 | CIRCUIT STATE 3 | CIRCUIT STATE 4 |
|---|---|---|---|---|
| | ABNORMAL | NORMAL | ABNORMAL | NORMAL |

FIG. 4D

| NORMALITY/ABNORMALITY RESULT | CIRCUIT STATE 1 | CIRCUIT STATE 2 | CIRCUIT STATE 3 | CIRCUIT STATE 4 |
|---|---|---|---|---|
| | NORMAL | ABNORMAL | NORMAL | ABNORMAL |

FIG. 7

| | CIRCUIT STATE 1A | CIRCUIT STATE 2A | CIRCUIT STATE 3A | CIRCUIT STATE 4A |
|---|---|---|---|---|
| RELAY RL3 | CLOSE | OPEN | CLOSE | OPEN |
| RELAY RL4 | OPEN | CLOSE | OPEN | CLOSE |
| CONNECTOR CN | CONNECTED | CONNECTED | DISCONNECTED | DISCONNECTED |

FIG. 8A

| NORMALITY/ABNORMALITY RESULT | CIRCUIT STATE 1A | CIRCUIT STATE 2A | CIRCUIT STATE 3A | CIRCUIT STATE 4A |
|---|---|---|---|---|
| | ABNORMAL | ABNORMAL | NORMAL | NORMAL |

FIG. 8B

| NORMALITY/ABNORMALITY RESULT | CIRCUIT STATE 1A | CIRCUIT STATE 2A | CIRCUIT STATE 3A | CIRCUIT STATE 4A |
|---|---|---|---|---|
| | ABNORMAL | NORMAL | ABNORMAL | NORMAL |

FIG. 8C

| NORMALITY/ABNORMALITY RESULT | CIRCUIT STATE 1A | CIRCUIT STATE 2A | CIRCUIT STATE 3A | CIRCUIT STATE 4A |
|---|---|---|---|---|
| | NORMAL | ABNORMAL | NORMAL | ABNORMAL |

FIG. 8D

| NORMALITY/ABNORMALITY RESULT | CIRCUIT STATE 1A | CIRCUIT STATE 2A | CIRCUIT STATE 3A | CIRCUIT STATE 4A |
|---|---|---|---|---|
| | ABNORMAL | ABNORMAL | ABNORMAL | ABNORMAL |

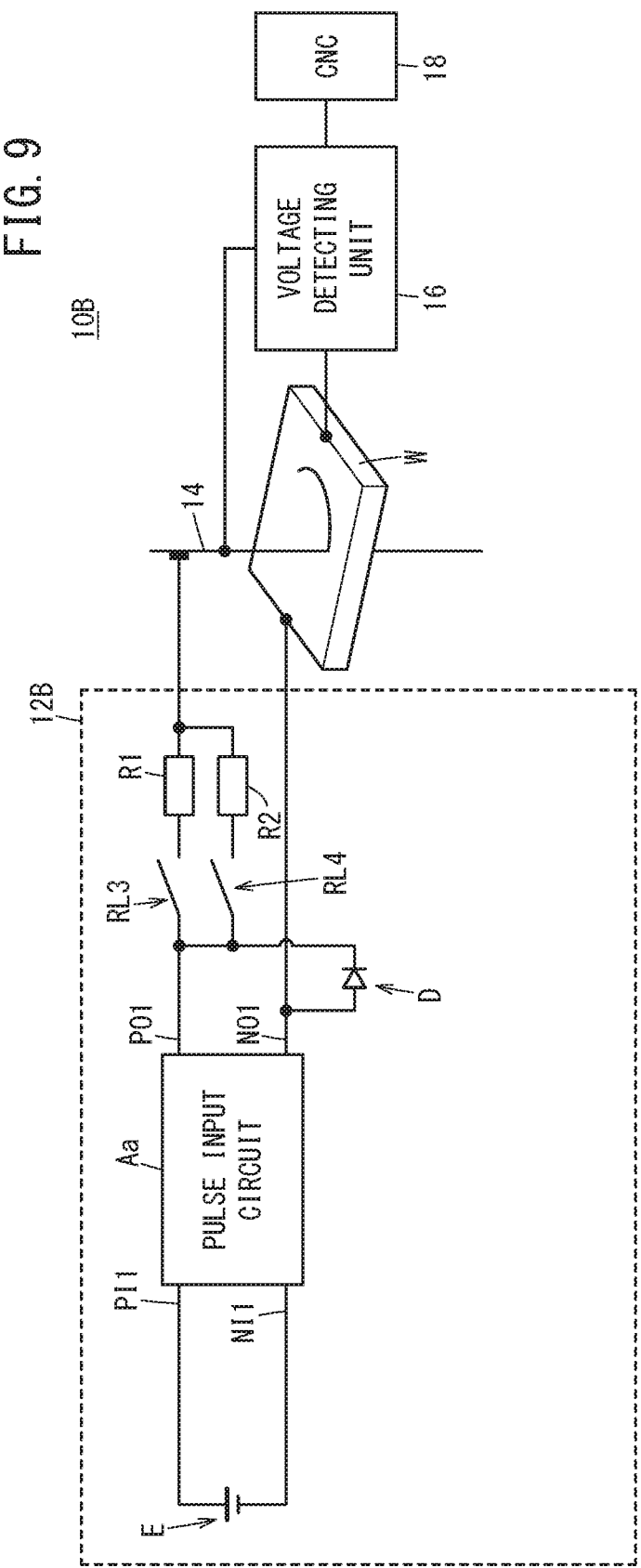

FIG. 10

| | CIRCUIT STATE 1B | CIRCUIT STATE 2B | CIRCUIT STATE 3B | CIRCUIT STATE 4B |
|---|---|---|---|---|
| RELAY RL3 | CLOSE | OPEN | CLOSE | OPEN |
| RELAY RL4 | OPEN | CLOSE | OPEN | CLOSE |
| SETTING OF PULSE INPUT CIRCUIT Aa | POLARITY STATE (+) | POLARITY STATE (+) | POLARITY STATE (−) | POLARITY STATE (−) |

FIG. 11

| NORMALITY/ ABNORMALITY RESULT | CIRCUIT STATE 1B | CIRCUIT STATE 2B | CIRCUIT STATE 3B | CIRCUIT STATE 4B |
|---|---|---|---|---|
| | ABNORMAL | ABNORMAL | NORMAL | NORMAL |

ELECTRICAL DISCHARGE MACHINE AND FAILURE DETERMINING METHOD

CROSS-REFERENCE TO RELATED APPLICATION

This application is based upon and claims the benefit of priority from Japanese Patent Application No. 2016-139231 filed on Jul. 14, 2016, the contents of which are incorporated herein by reference.

BACKGROUND OF THE INVENTION

Field of the Invention

The present invention relates to an electrical discharge machine which performs electrical discharge machining by applying a voltage to an inter-electrode gap formed by an electrode and a target workpiece and causing a current to flow, and a failure determining method of the electrical discharge machine.

Description of the Related Art

An electrical discharge machine is used in various fields, and therefore needs to perform machining for which a machining speed is demanded or machining for which accuracy is demanded. When the machine speed is considered to be important, a pulse current of great energy is inputted to an inter-electrode gap. When the machine accuracy is considered to be important, a stray capacity of the inter-electrode gap is excluded as much as possible, and a pulse current of small energy is applied to the inter-electrode gap.

Japanese Laid-Open Patent Publication No. 2002-066843 discloses separating a stray capacity from an inter-electrode gap by using an opening/closing unit such as a relay or a switch. Further, many wire electrical discharge machines each include a cutting function of cutting a wire electrode. Japanese Laid-Open Patent Publication No. 2015-037813 discloses limiting a current caused to flow in a wire during wire cutting by switching a connection of a plurality of resistors by an opening/closing unit. Thus, generally, the electrical discharge machine can set a plurality of circuit states by switching an opening/closing unit of a circuit inside a machining power supply according to a purpose.

SUMMARY OF THE INVENTION

A circuit state of the machining power supply can be set to a plurality of circuit states. Therefore, there is a problem that occurrence of a failure in a component (constituent member) of the machining power supply makes it difficult to identify a failure portion. When the failure occurs, a maintenance operator (operator) narrows down possible failure portions to identify a failure portion by switching a circuit state. The maintenance operator needs to have knowledge about internal circuits to narrow down the failure portion. The maintenance operator without the knowledge about the internal circuits needs to narrow down the failure portion according to a maintenance procedure described in maintenance document. However, depending on a skill of the maintenance operator, it is difficult to specify the failure portion or a great amount of time is taken to specify the failure portion.

To make it easy to specify a failure portion, alarm detecting units may be provided to all components (component elements) of the machining power supply, and detection results may be displayed on a screen. For example, alarm detecting units with alarm contacts may be mounted on a fuse and a breaker to monitor a contact signal. However, providing the alarm detecting units at several portions is costly. When the component (constituent member) is a semiconductor switching element or a resistor, it is generally difficult to detect an alarm, and therefore a dedicated circuit for detecting the alarm is necessary and is costly. Further, reliability of the dedicated circuit also matters.

It is therefore an object of the present invention to provide an electrical discharge machine and a failure determining method which can easily specify a failure portion of a machining power supply without increasing cost.

A first aspect of the present invention is an electrical discharge machine configured to perform electrical discharge machining by applying a voltage to an inter-electrode gap formed between an electrode and a target workpiece and causing a current to flow, and includes: a machining power supply having a plurality of different circuit states, and configured to be capable of being set to one circuit state of the plurality of circuit states by switching at least one of electrical connection and electrical setting; a state determining unit configured to, when each of the plurality of circuit states is set as the circuit state of the machining power supply, determine whether or not the set circuit state is normal; a failure portion specifying unit configured to specify a failure portion of the machining power supply based on a determination result with respect to each of the plurality of circuit states obtained by the state determining unit; and a reporting unit configured to report the failure portion specified by the failure portion specifying unit to an operator.

According to this configuration, it is possible to easily specify a failure portion of the machining power supply while costs are reduced, and the operator can recognize the failure portion.

The first aspect of the present invention is the electrical discharge machine, and may further include a setting switching unit configured to set each of the plurality of circuit states as the circuit state of the machining power supply in order by switching at least one of the electrical connection and the electrical setting, and the state determining unit may be configured to, when the circuit state of the machining power supply is switched, determine whether or not the switched circuit state is normal. Consequently, it is possible to determine whether each circuit state is normal or abnormal.

The first aspect of the present invention is the electrical discharge machine, and the reporting unit may be configured to, when the setting switching unit switches the circuit state set to the machining power supply, and when the operator needs to perform a switching operation, report the switching operation to the operator. Consequently, even when the operator needs to perform an operation to switch the circuit state of the machining power supply, it is possible to appropriately switch the circuit state of the machining power supply.

The first aspect of the present invention is the electrical discharge machine, and may further include a voltage detecting unit configured to detect an inter-electrode voltage applied to the inter-electrode gap, and the state determining unit may be configured to, when each of the plurality of circuit states is set as the circuit state of the machining power supply, determine whether or not the circuit state is normal based on the inter-electrode voltage detected by the voltage detecting unit. When the circuit state is normal, the voltage is applied to the inter-electrode gap normally. When the circuit state is abnormal, the voltage to be applied to the inter-electrode gap is remarkably different from a normal time. Consequently, by using the inter-electrode voltage, it is possible to easily and precisely determine whether the circuit state is normal or abnormal.

The first aspect of the present invention is the electrical discharge machine, and the state determining unit may be configured to, when the inter-electrode voltage detected by the voltage detecting unit is not in a predetermined range determined in advance in accordance with the set circuit state of the machining power supply, determine that the circuit state is abnormal. Consequently, by comparing the inter-electrode voltage and the predetermined range, it is possible to easily and precisely determine whether the circuit state is normal or abnormal. Further, even when the inter-electrode voltage varies due to an individual difference of the electrical discharge machine, and materials of electrodes and target workpieces, it is possible to absorb these variations. That is, it is possible to prevent an influence of these variations on determination as to whether the circuit state is normal or abnormal.

The first aspect of the present invention is the electrical discharge machine, and may further include a table configured to store the failure portion and abnormality patterns of the plurality of circuit states associated with the failure portion, and the failure portion specifying unit may be configured to specify the failure portion by comparing the abnormality patterns stored in the table and the determination result with respect to each of the plurality of circuit states obtained by the state determining unit. Consequently, it is possible to easily specify the failure portion while costs are reduced.

A second aspect of the present invention is a failure determining method of an electrical discharge machine including a machining power supply having a plurality of different circuit states, and configured to be capable of being set to one circuit state of the plurality of circuit states by switching at least one of electrical connection and electrical setting, and configured to perform electrical discharge machining by applying a voltage to an inter-electrode gap formed between an electrode and a target workpiece and causing a current to flow, and includes: a state determining step of, when each of the plurality of circuit states is set as the circuit state of the machining power supply, determining whether or not the set circuit state is normal; a failure portion specifying step of specifying a failure portion of the machining power supply based on a determination result with respect to each of the plurality of circuit states obtained in the state determining step; and a reporting step of reporting the failure portion specified in the failure portion specifying step to an operator.

According to this configuration, it is possible to easily specify the failure portion of the machining power supply while costs are reduced, and the operator can recognize the failure portion.

The second aspect of the present invention is the failure determining method may further include a setting switching step of setting each of the plurality of circuit states as the circuit state of the machining power supply in order by switching at least one of the electrical connection and the electrical setting, and, in the state determining step, when the circuit state of the machining power supply is switched, whether or not the switched circuit state is normal may be determined. Consequently, it is possible to determine whether each circuit state is normal or abnormal.

The second aspect of the present invention is the failure determining method, and, in the reporting step, when the circuit state set to the machining power supply is switched in the setting switching step, and when the operator needs to perform a switching operation, the switching operation may be reported to the operator. Consequently, even when the operator needs to perform the operation to switch the circuit state of the machining power supply, it is possible to appropriately switch the circuit state of the machining power supply.

The second aspect of the present invention is the failure determining method, and may further include a voltage detecting step of detecting an inter-electrode voltage applied to the inter-electrode gap, and, in the state determining step, when each of the plurality of circuit states is set as the circuit state of the machining power supply, whether or not the circuit state is normal may be determined based on the inter-electrode voltage detected in the voltage detecting step. When the circuit state is normal, the voltage is applied to the inter-electrode gap normally. When the circuit state is abnormal, the voltage to be applied to the inter-electrode gap is remarkably different from a normal time. Consequently, by using the inter-electrode voltage, it is possible to easily and precisely determine whether the circuit state is normal or abnormal.

The second aspect of the present invention is the failure determining method, and, in the state determining step, when the inter-electrode voltage detected in the voltage detecting step is not in a predetermined range determined in advance in accordance with the set circuit state of the machining power supply, it may be determined that the circuit state is abnormal. Consequently, by comparing the inter-electrode voltage and the predetermined range, it is possible to easily and precisely determine whether the circuit state is normal or abnormal. Further, when the inter-electrode voltage varies due to an individual difference of the electrical discharge machine, and materials of electrodes and target workpieces, it is possible to absorb these variations. That is, it is possible to prevent an influence of these variations on determination as to whether the circuit state is normal or abnormal.

The second aspect of the present invention is the failure determining method, and may further include a storing step of storing the failure portion and abnormality patterns of the plurality of circuit states associated with the failure portion as a table, and, in the failure portion specifying step, the failure portion may be specified by comparing the abnormality patterns stored in the table and the determination result with respect to each of the plurality of circuit states obtained in the state determining step. Consequently, it is possible to easily specify the failure portion while costs are reduced.

According to the present invention, it is possible to easily specify a failure portion of the machining power supply while costs are reduced, and the operator can recognize the failure portion.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a view showing a relationship between each of four circuit states and each of on/off states of four relay switches according to the first embodiment;

FIG. 4A is a view showing a determination result with respect to each of a plurality of circuit states provided by a state determining unit when a failure occurs in a first resistor shown in FIG. 1;

FIG. 4B is a view showing a determination result with respect to each of the plurality of circuit states provided by the state determining unit when a failure occurs in a second resistors shown in FIG. 1;

FIG. 4C is a view showing a determination result with respect to each of the plurality of circuit states provided by the state determining unit when a failure occurs in a first pulse input circuit shown in FIG. 1;

FIG. 4D is a view showing a determination result with respect to each of the plurality of circuit states provided by the state determining unit when a failure occurs in a second pulse input circuit shown in FIG. 1;

FIG. 7 is a view showing a relationship between each of the four circuit states and each of on/off states of two relay switches and the states of a connector according to the second embodiment;

FIG. 8A is a view showing a determination result with respect to each of the plurality of circuit states provided by the state determining unit when a failure occurs in a capacitor shown in FIG. 6;

FIG. 8B is a view showing a determination result with respect to each of the plurality of circuit states provided by the state determining unit when a failure occurs in the first resistor shown in FIG. 6;

FIG. 8C is a view showing a determination result with respect to each of the plurality of circuit states provided by the state determining unit when a failure occurs in the second resistor shown in FIG. 6;

FIG. 8D is a view showing a determination result with respect to each of the plurality of circuit states provided by the state determining unit when a failure occurs in the pulse input circuit shown in FIG. 6;

FIG. 9 is a configuration diagram of the electrical discharge machine according to the third embodiment;

FIG. 10 is a view showing a relationship between each of the four circuit states, the on/off states of the two relay switches and polarity states of the pulse input circuit according to the third embodiment; and FIG. 11 is a view showing a determination result with respect to each of the plurality of circuit states provided by the state determining unit when a short-circuiting failure occurs in a diode shown in FIG. 9.

DESCRIPTION OF THE PREFERRED EMBODIMENTS

Preferred embodiments of an electrical discharge machine and a failure determining method according to the present invention will be described in detail below with reference to the accompanying drawings.

First Embodiment

Figure 1:
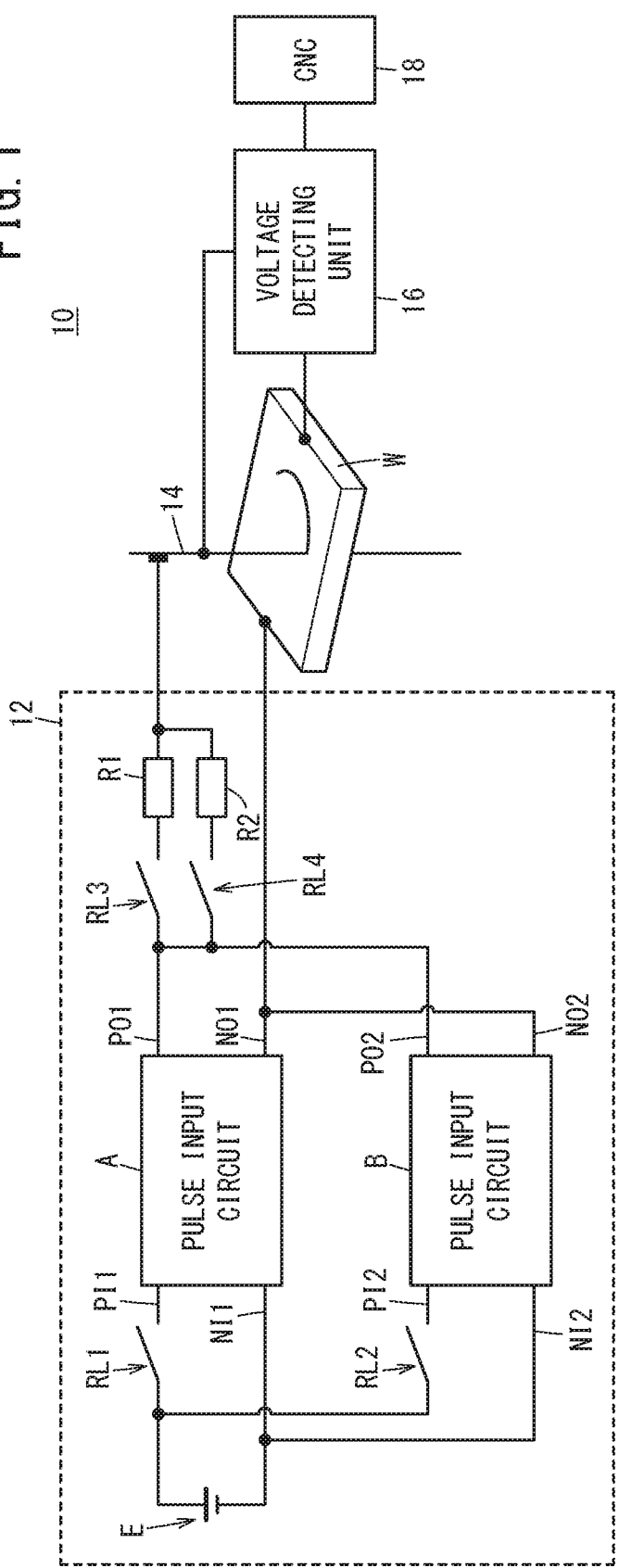
FIG. 1 is a configuration diagram of an electrical discharge machine according to a first embodiment.

FIG. 1 is a configuration diagram of an electrical discharge machine 10 according to the first embodiment. The electrical discharge machine 10 includes at least a machining power supply 12, an electrode 14, a voltage detecting unit 16 and a CNC (numerical control device) 18. The electrical discharge machine 10 performs electrical discharge machining on a target workpiece W by applying a voltage to an inter-electrode gap formed between the electrode 14 and the target workpiece (processed workpiece) W and causing a current to flow.

The machining power supply 12 includes a power supply E, two pulse input circuits A, B, four relay switches RL1 to RL4, and two resistors R1, R2. The power supply E is a direct current power supply. A positive electrode (+ electrode) of the power supply E is connected to a positive electrode-side input unit PI1 of the pulse input circuit (first pulse input circuit) A via the relay switch RL1, and is connected to a positive electrode-side input unit PI2 of the pulse input circuit (second pulse input circuit) B via the relay switch RL2.

A negative electrode (− electrode) is connected to negative electrode-side input units NI1, NI2 of the pulse input circuit A and the pulse input circuit B. That is, the relay switches RL1, RL2 are relay switches that switch the pulse input circuits A, B to select which one is used as a pulse input circuit that applies a voltage (pulse voltage) to an inter-electrode gap. Hence, only one of the relay switch (first relay switch) RL1 and the relay switch (second relay switch) RL2 is in the "ON" state (close), and both are not simultaneously in the "ON" state (close).

The positive electrode-side output units PO1, PO2 of the pulse input circuit A and the pulse input circuit B are connected to the electrode 14 via the relay switch RL3 and the resistor (first resistor) R1, and are connected to the electrode 14 via the relay switch RL4 and the resistor (second resistor) R2. That is, the relay switch RL3 and the resistor R1, and the relay switch RL4 and the resistor R2 are in parallel.

Negative electrode-side output units NO1, NO2 of the pulse input circuit A and the pulse input circuit B are connected to the target workpiece W. That is, the relay switches RL3, RL4 are relay switches that switch the resistors R1, R2 in order to apply voltages to the inter-electrode gap. Hence, only one of the relay switch (third relay switch) RL3 and the relay switch (fourth relay switch) RL4 is in the "ON" state (close), or both are in the "ON" state (close).

The voltage detecting unit 16 is a circuit that detects a voltage V (hereinafter "inter-electrode voltage V") applied to the inter-electrode gap formed between the electrode 14 and the target workpiece W. The inter-electrode voltage V detected by the voltage detecting unit 16 is outputted to the CNC 18. The CNC 18 identifies in which part (a component or a constituent member) of the machining power supply 12 a failure occurs based on the inter-electrode voltage V, and reports the specified failure portion to an operator. Further, the CNC 18 controls the pulse input circuits A, B and the relay switches RL1 to RL4.

The pulse input circuits A, B each generate a pulse voltage based on the voltage of the power supply E, applies (inputs) the generated pulse voltage to the inter-electrode gap, and causes a pulse current to flow. That is, the pulse input circuits A, B input the pulse voltages and the pulse currents to the inter-electrode gap. The pulse input circuit A and the pulse input circuit B generate the pulse voltages (pulse currents) of different frequencies. Consequently, energy per one pulse of the pulse voltage (pulse current) generated by the pulse input circuit A can be set to be different from energy per one pulse of the pulse voltage (pulse current) generated by the pulse input circuit B. The CNC 18 controls the frequencies of the pulse voltages (pulse currents) generated by the pulse input circuits A, B.

The relay switches RL1 to RL4 allow the machining power supply 12 to have a plurality of different circuit states. That is, it is possible to form the plurality of circuit states by switching electrical connections of the relay switches RL1 to RL4, and set the circuit state of the machining power supply 12 to one of the plurality of circuit states. In the first embodiment, the machining power supply 12 can take four circuit states 1 to 4. Consequently, it is possible to set the circuit state of the machining power supply 12 to one of the four circuit states 1 to 4.

FIG. 2 is a view showing a relationship between each of the four circuit states 1 to 4 and on/off states of the four relay switches RL1 to RL4. Circuit state 1 of the machining power supply 12 is a state where the relay switch RL1 is on (CLOSE), the relay switch RL2 is off (OPEN), the relay switch RL3 is on (CLOSE) and the relay switch RL4 is off (OPEN). That is, in the circuit state 1, the pulse current outputted from the pulse input circuit A flows to the inter-electrode gap via the resistor R1.

Circuit state 2 of the machining power supply 12 is a state where the relay switch RL1 is off (OPEN), the relay switch RL2 is on (CLOSE), the relay switch RL3 is on (CLOSE) and the relay switch RL4 is off (OPEN). That is, in the circuit state 2, the pulse current outputted from the pulse input circuit B flows to the inter-electrode gap via the resistor R1.

Circuit state 3 of the machining power supply 12 is a state where the relay switch RL1 is on (CLOSE), the relay switch RL2 is off (OPEN), the relay switch RL3 is off (OPEN) and the relay switch RL4 is on (CLOSE). That is, in the circuit state 3, the pulse current outputted from the pulse input circuit A flows to the inter-electrode gap via the resistor R2.

Circuit state 4 of the machining power supply 12 is a state where the relay switch RL1 is off (OPEN), the relay switch RL2 is on (CLOSE), the relay switch RL3 is off (OPEN) and the relay switch RL4 is on (CLOSE). That is, in the circuit state 4, the pulse current outputted from the pulse input circuit B flows to the inter-electrode gap via the resistor R2.

Figure 3:
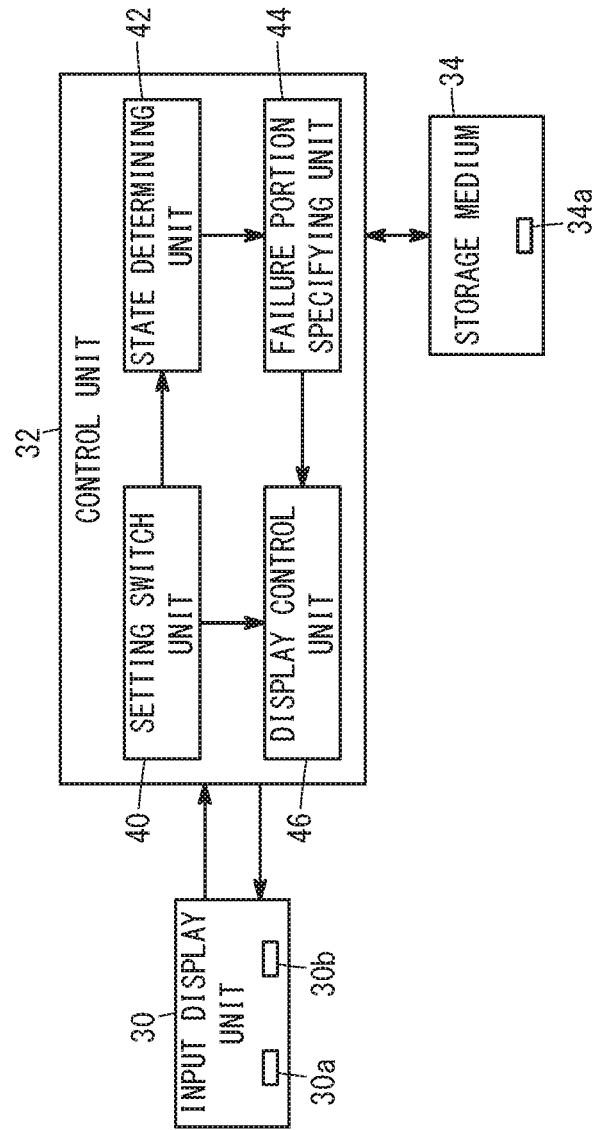
FIG. 3 is a configuration diagram of a CNC shown in FIG. 1.

Next, a configuration of the CNC 18 will be described with reference to FIG. 3. The CNC 18 includes an input display unit 30, a control unit 32 and a storage medium 34. The input display unit 30 includes an operation unit (input unit) 30*a* that is operated by the operator to input information and an instruction, and a display unit 30*b* that displays information for the operator. This display unit 30*b* functions as a reporting unit that reports the information to the operator. The operation unit 30*a* is made up from a numerical data input numeric keypad, various function keys and a keyboard. The operation unit 30*a* includes a touch panel provided on a screen of the display unit 30*b*.

The control unit 32 includes a processor such as a CPU and a memory chip in which programs are stored. The processor executing the programs functions as the control unit 32 of the first embodiment. The storage medium 34 stores information that is necessary to control the control unit 32.

The control unit 32 includes a setting switching unit 40, a state determining unit 42, a failure portion specifying unit 44 and a display control unit 46. A configuration of the control unit 32 shown in FIG. 3 is a configuration of a failure determining function. When the operator operates the operation unit 30*a* of the input display unit 30 to start the failure determining function, the control unit 32 starts failure determination on the machining power supply 12. The operator operates the operation unit 30*a* while watching the screen of the display unit 30*b* of the input display unit 30 and starts the failure determining function.

The setting switching unit 40 controls on/off of the relay switches RL1 to RL4 (switches electrical connection), and sets the circuit state of the machining power supply 12. The setting switching unit 40 sequentially sets the circuit states 1 to 4 as the circuit state of the machining power supply 12. In the first embodiment, the setting switching unit 40 sets the circuit state of the machining power supply 12 by switching the circuit states in the following order: the circuit state 1→the circuit state 2→the circuit state 3→the circuit state 4. A timing to switch the circuit states may be a timing when a fixed time has passed after the setting of the circuit state or a timing at which the state determining unit 42 described below determines whether the circuit state is normal or abnormal. Once the circuit states of the machining power supply 12 is switched, the setting switching unit 40 outputs to the state determining unit 42 a switch signal indicating the switching having been done.

When each of the plurality of circuit states 1 to 4 is set as the circuit state of the machining power supply 12, the state determining unit 42 determines whether or not the set circuit state is normal. More specifically, when each of the plurality of circuit states 1 to 4 is set as the circuit state of the machining power supply 12, the state determining unit 42 determines whether or not the circuit state is normal based on the inter-electrode voltage V detected by the voltage detecting unit 16. When the circuit state of the machining power supply 12 changes, the state determining unit 42 determines whether or not a new circuit state is normal based on the inter-electrode voltage V detected by the voltage detecting unit 16 at the time of change. The state determining unit 42 outputs information indicating a determination result with respect to each of the plurality of circuit states 1 to 4 to the failure portion specifying unit 44.

In a case of the normal circuit state, the voltage is normally applied to the inter-electrode gap, and therefore the inter-electrode voltage V settles in a predetermined range. However, in a case of the abnormal circuit state, the voltage is not normally applied to the inter-electrode gap, and therefore the inter-electrode voltage V is outside a predetermined range. The inter-electrode voltage V varies depending on individual differences between electrical discharge machines 10, on materials of the electrode 14 and the target workpiece W, and on the like. Therefore, this predetermined range is set to such a range that can absorb these variations.

This predetermined range is set by taking into account an acceptable error $\pm\varepsilon$ ($\varepsilon$ is a predetermined value) with respect to a reference voltage Vr (Vr is a predetermined fixed voltage value). Hence, the predetermined range can be expressed as Vr−$\varepsilon$ to Vr+$\varepsilon$. Hence, when the inter-electrode voltage V satisfies a relationship of Vr−$\varepsilon$≤V≤Vr+$\varepsilon$, the state determining unit 42 determines that the circuit state is normal. When, for example, Vr is 80 V and $\varepsilon$ is 5 V, the predetermined range is 75 V to 85 V. When the inter-electrode voltage V is in the range of 75 V to 85 V, the state determining unit 42 determines that the circuit state is normal.

In this regard, the predetermined range (at least one of Vr and $\varepsilon$) may be changed according to the pulse input circuit used to apply the voltage to the inter-electrode gap. That is, the predetermined range may be changed according to the pulse input circuit A and the pulse input circuit B. Further, the predetermined range (at least one of Vr and $\varepsilon$) may be changed according to a resistor used to apply the voltage to the inter-electrode gap. That is, the predetermined range may be changed according to the resistor R1 and the resistor R2. Further, the predetermined range may be changed according to each of the plurality of circuit states 1 to 4.

The failure portion specifying unit 44 specifies the failure portion of the machining power supply 12 based on the determination result with respect to each of the plurality of circuit states 1 to 4 provided by the state determining unit 42. FIG. 4A is a view showing the determination result with respect to each of the plurality of circuit states 1 to 4 provided by the state determining unit 42 when a failure occurs in the resistor R1. FIG. 4B is a view showing the determination result with respect to each of the plurality of circuit states 1 to 4 provided by the state determining unit 42 when a failure occurs in the resistor R2. FIG. 4C is a view showing the determination result with respect to each of the plurality of circuit states 1 to 4 provided by the state determining unit 42 when a failure occurs in the pulse input circuit A. FIG. 4D is a view showing the determination result with respect to each of the plurality of circuit states 1 to 4 provided by the state determining unit 42 when a failure occurs in the pulse input circuit B.

When the failure occurs in the resistor R1 as shown in FIG. 4A, the state determining unit 42 determines that the circuit states 1, 2 where the resistor R1 is used are abnormal, and the circuit states 3, 4 where the resistor R1 is not used but the resistor R2 is used instead are normal. Meanwhile, when the failure occurs in the resistor R2 as shown in FIG. 4B, the state determining unit 42 determines that the circuit states 3, 4 where the resistor R2 is used are abnormal, and the circuit states 1, 2 where the resistor R2 is not used but the resistor R1 is used instead are normal.

When the failure occurs in the pulse input circuit A as shown in FIG. 4C, the state determining unit 42 determines that the circuit states 1, 3 where the pulse input circuit A is used are abnormal, and the circuit states 2, 4 where the pulse input circuit A is not used but the pulse input circuit B is used instead are normal. Meanwhile, when the failure occurs in the pulse input circuit B as shown in FIG. 4D, the state determining unit 42 determines that the circuit states 2, 4 where the pulse input circuit B is used are abnormal, and the circuit states 1, 3 where the pulse input circuit B is not used but the pulse input circuit A is used instead are normal.

Thus, the failure portion specifying unit 44 can specify the failure portion of the machining power supply 12 based on an abnormality pattern indicating whether each of the plurality of circuit states 1 to 4 is abnormal or normal. The storage medium 34 includes a table 34a which stores a plurality of failure portions and abnormality patterns (the pieces of the information shown in FIGS. 4A to 4D) of the plurality of circuit states 1 to 4 associated with the plurality of failure portions, respectively. The failure portion specifying unit 44 specifies the failure portion by comparing the abnormality patterns stored in the table 34a and the determination results with respect to the plurality of circuit states 1 to 4 obtained by the state determining unit 42. The failure portion specifying unit 44 outputs failure portion information indicating the specified failure portion to the display control unit 46.

The display control unit 46 performs control to cause the input display unit 30 (more specifically, the display unit 30b) to display information of contents corresponding to the failure portion based on the failure portion information and display contents information stored in the storage medium 34. Thus, the display unit 30b of the input display unit 30 displays the specified failure portion. When, for example, the resistor R1 is specified as the failure portion, the screen of the display unit 30b displays messages such as "A failure has occurred in the resistor R1". In this regard, the CNC 18 may include a sound output unit (reporting unit) such as a speaker. The sound output unit may output a sound or a warning sound indicating the specified failure portion.

An operation of the CNC 18 (more specifically, the control unit 32) will be described with reference to the flowchart shown in FIG. 5. When the operator operates the operation unit 30a to start the failure determining function, the CNC 18 starts failure determination on the machining power supply 12 and executes the operation shown in FIG. 5.

First, when starting the failure determination on the machining power supply 12, the control unit 32 drives the pulse input circuits A, B (step S1). Next, the setting switching unit 40 of the control unit 32 controls the relay switches RL1 to RL4, and sets the circuit state of the machining power supply 12 to the circuit state 1 (step S2). That is, the setting switching unit 40 switches the relay switches RL1 and the relay switches RL3 to on (CLOSE) and switches the relay switch RL2 and the relay switch RL4 to off (OPEN).

Next, the state determining unit 42 obtains the inter-electrode voltage V detected by the voltage detecting unit 16 (step S3), and determines whether or not the obtained inter-electrode voltage V is in the predetermined range (step S4). That is, the state determining unit 42 determines whether or not the obtained inter-electrode voltage V satisfies the relationship of $Vr-\varepsilon \leq V \leq Vr+\varepsilon$.

When it is determined in step S4 that the inter-electrode voltage V is in the predetermined range, i.e., the inter-electrode voltage V satisfies the relationship of $Vr-\varepsilon \leq V \leq Vr+\varepsilon$, the state determining unit 42 determines that the current circuit state is normal (step S5), and the flow moves to step S7. Meanwhile, when it is determined in step S4 that the inter-electrode voltage V is not in the predetermined range, i.e., the inter-electrode voltage V does not satisfy the relationship of $Vr-\varepsilon \leq V \leq Vr+\varepsilon$, the state determining unit 42 determines that the current circuit state is abnormal (step S6), and the flow moves to step S7.

When the flow moves to step S7, the setting switching unit 40 determines whether or not all circuit states 1 to 4 have been set as the circuit state of the machining power supply 12. When it is determined in step S7 that all circuit states 1 to 4 are not yet set, the setting switching unit 40 controls the relay switch RL1 to RL4 and sets the circuit state of the machining power supply 12 to a next circuit state (step S9), and the flow returns to step S3. When, for example, the currently set circuit state is the circuit state 1, the setting switching unit 40 switches the circuit state 1 to the circuit state 2. Hence, the setting switching unit 40 retains the on/off states of the relay switches RL3, RL4, switches the relay switch RL1 from on (CLOSE) to off (OPEN) and switches the relay switch RL2 from off (OPEN) to on (CLOSE). In this regard, as described above, the setting switching unit 40 switches the circuit state in the following order: the circuit state 1→the circuit state 2→the circuit state 3→the circuit state 4.

Meanwhile, when determining in step S7 that all circuit states 1 to 4 have been set, the failure portion specifying unit 44 specifies the failure portion based on the table 34a and a normality/abnormality determination result with respect to each of the plurality of circuit states 1 to 4 (step S8). The display unit 30b reports the failure portion to the operator by displaying the specified failure portion (step S10).

Second Embodiment

Figure 6:
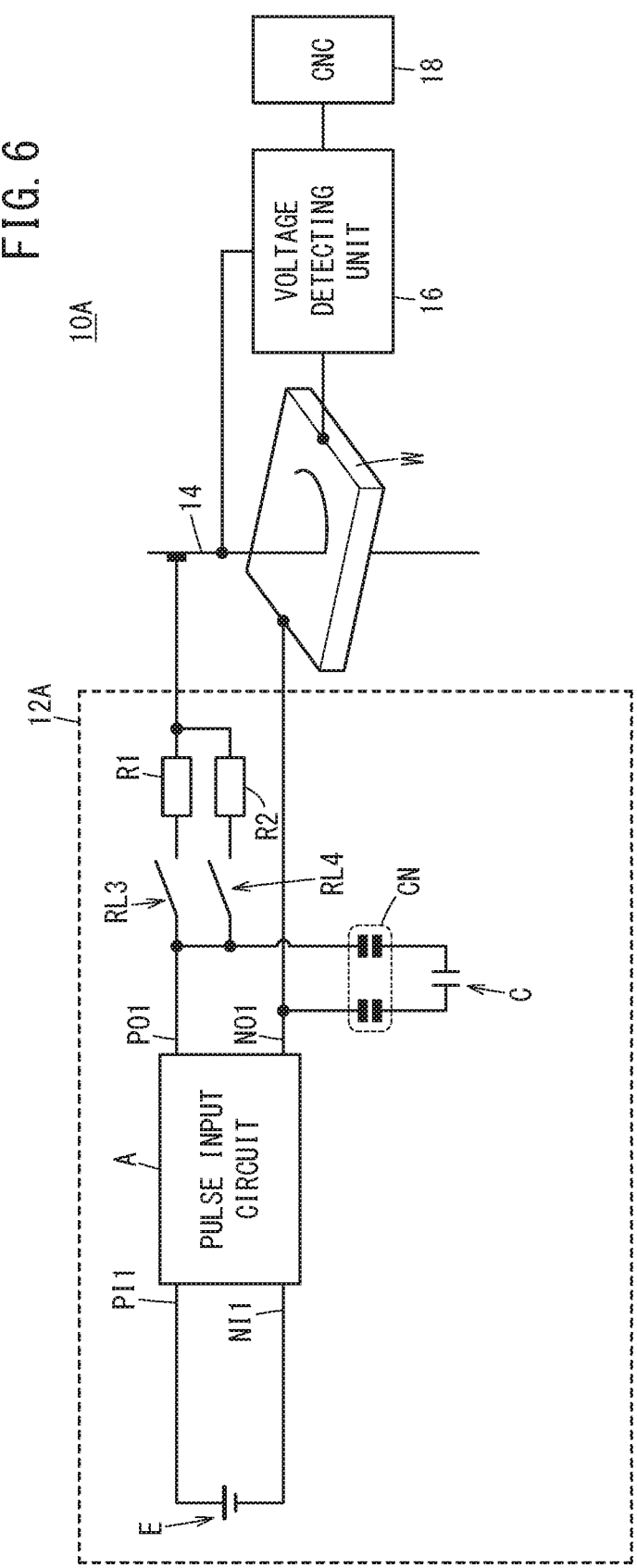
FIG. 6 is a configuration diagram of an electrical discharge machine according to the second embodiment.

FIG. 6 is a configuration diagram of an electrical discharge machine 10A according to the second embodiment.

The same components as those in the first embodiment will be assigned the same reference numerals, and only differences will be described. The electrical discharge machine 10A includes at least a machining power supply 12A, the electrode 14, the voltage detecting unit 16 and the CNC (numerical control device) 18.

The machining power supply 12A includes the power supply E, the pulse input circuit A, the two relay switches RL3, RL4, the two resistors R1, R2, a connector CN and a capacitor C. The positive electrode of the power supply E is connected to the positive electrode-side input unit PI1 of the pulse input circuit A. The negative electrode of the power supply E is connected to the negative electrode-side input unit NI1 of the pulse input circuit A. The positive electrode-side output unit PO1 of the pulse input circuit A is connected to the electrode 14 via the relay switch RL3 and the resistor R1, and is connected to the electrode 14 via the relay switch RL4 and the resistor R2. The negative electrode-side output unit NO1 of the pulse input circuit A is connected to the target workpiece W. The pulse input circuit A and the electrode 14 are connected in the same way as that in the first embodiment.

The positive electrode-side output unit PO1 and the negative electrode-side output unit NO1 of the pulse input circuit A are connected with each other via the capacitor C. The capacitor C is connected in parallel to the inter-electrode gap, and stabilizes (smoothes) the inter-electrode voltage V. A connection point between the capacitor C and the positive electrode-side output unit PO1 of the pulse input circuit A is positioned between the positive electrode-side output unit PO1 of the pulse input circuit A and the relay switches RL3, RL4. A connection point between the capacitor C and the negative electrode-side output unit NO1 of the pulse input circuit A is positioned between the negative electrode-side output unit NO1 of the pulse input circuit A and the target workpiece W. The pulse input circuit A and the capacitor C are connected via the connector CN. The connector CN enables detachable connection of the capacitor C to and from the pulse input circuit A.

In the second embodiment, the relay switches RL3, RL4 and the connector CN allow the machining power supply 12A to have a plurality of different circuit states. That is, by controlling an electrical connection of the relay switches RL3, RL4 and an electrical setting of the connector CN, it is possible to form the plurality of circuit states, and set the circuit state of the machining power supply 12A to one circuit state of the plurality of circuit states. In the second embodiment, the machining power supply 12A can take four circuit states 1A to 4A. Consequently, it is possible to set the circuit state of the machining power supply 12A to one circuit state of the four circuit states 1A to 4A. In the second embodiment, the circuit state of the machining power supply 12A is switched in the following order: the circuit state 1A→the circuit state 2A→the circuit state 3A→the circuit state 4A.

FIG. 7 is a view showing a relationship between each of the four circuit states 1A to 4A, each of on/off states of the two relay switches RL3, RL4, and a state of the connector CN. The circuit state of the machining power supply 12A in a case where the relay switch RL3 is on (CLOSE), the relay switch RL4 is off (OPEN), and the connector CN is connected in parallel to the pulse input circuit A is defined as the circuit state 1A. That is, in the circuit state 1A, the capacitor C is connected in parallel to the inter-electrode gap, and the pulse current from the pulse input circuit A flows to the inter-electrode gap via the resistor R1.

The circuit state of the machining power supply 12A in a case where the relay switch RL3 is off (OPEN), the relay switch RL4 is on (CLOSE), and the connector CN is connected in parallel to the pulse input circuit A is defined as the circuit state 2A. That is, in the circuit state 2A, the capacitor C is connected in parallel to the inter-electrode gap, and the pulse current from the pulse input circuit A flows to the inter-electrode gap via the resistor R2.

The circuit state of the machining power supply 12A in a case where the relay switch RL3 is on (CLOSE), the relay switch RL4 is off (OPEN), and the connector CN is disconnected from the pulse input circuit A is defined as the circuit state 3A. That is, in the circuit state 3A, the capacitor C is not connected with the inter-electrode gap, and the pulse current from the pulse input circuit A flows to the inter-electrode gap via the resistor R1.

The circuit state of the machining power supply 12A in a case where the relay switch RL3 is off (OPEN), the relay switch RL4 is on (CLOSE), and the connector CN is disconnected from the pulse input circuit A is defined as the circuit state 4A. That is, in the circuit state 4A, the capacitor C is not connected with the inter-electrode gap, and the pulse current from the pulse input circuit A flows to the inter-electrode gap via the resistor R2.

FIG. 8A is a view showing a determination result with respect to each of the plurality of circuit states 1A to 4A obtained by the state determining unit 42 when a failure occurs in the capacitor C. FIG. 8B is a view showing a determination result with respect to each of the plurality of circuit states 1A to 4A obtained by the state determining unit 42 when a failure occurs in the resistor R1. FIG. 8C is a view showing a determination result with respect to each of the plurality of circuit states 1A to 4A obtained by the state determining unit 42 when a failure occurs in the resistor R2. FIG. 8D is a view showing a determination result with respect to each of the plurality of circuit states 1A to 4A obtained by the state determining unit 42 when a failure occurs in the pulse input circuit A.

When the failure occurs in the capacitor C as shown in FIG. 8A, the state determining unit 42 determines that the circuit states 1A, 2A where the capacitor C is used are abnormal yet the circuit states 3A, 4A where the capacitor C is not used are normal. When the failure occurs in the resistor R1 as shown in FIG. 8B, the state determining unit 42 determines that the circuit states 1A, 3A where the resistor R1 is used are abnormal yet the circuit states 2A, 4A where the resistor R1 is not used, i.e., the resistor R2 is used are normal.

When the failure occurs in the resistor R2 as shown in FIG. 8C, the state determining unit 42 determines that the circuit states 2A, 4A where the resistor R2 is used are abnormal yet the circuit states 1A, 3A where the resistor R2 is not used, i.e., the resistor R1 is used are normal. When the failure occurs in the pulse input circuit A as shown in FIG. 8D, the state determining unit 42 determines that the circuit states where the pulse input circuit A is used, i.e., all circuit states 1A to 4A are abnormal.

The state determining unit 42 determines whether each of the plurality of circuit states 1A to 4A is normal or abnormal in the same way as that in the first embodiment. That is, when each of the plurality of circuit states 1A to 4A is set as the circuit state of the machining power supply 12A, the state determining unit 42 determines whether or not the circuit state is normal based on the inter-electrode voltage V detected by the voltage detecting unit 16.

Hence, the table 34a of the CNC 18 stores a plurality of failure portions and abnormality patterns (the pieces of information shown in FIGS. 8A to 8D) of the plurality of circuit states 1A to 4A associated with the plurality of failure portions. The failure portion specifying unit 44 of the CNC 18 can specify a failure portion by comparing the abnormality patterns stored in the table 34a and the determination results with respect to the plurality of circuit states 1A to 4A obtained by state determining unit 42.

Figure 5:
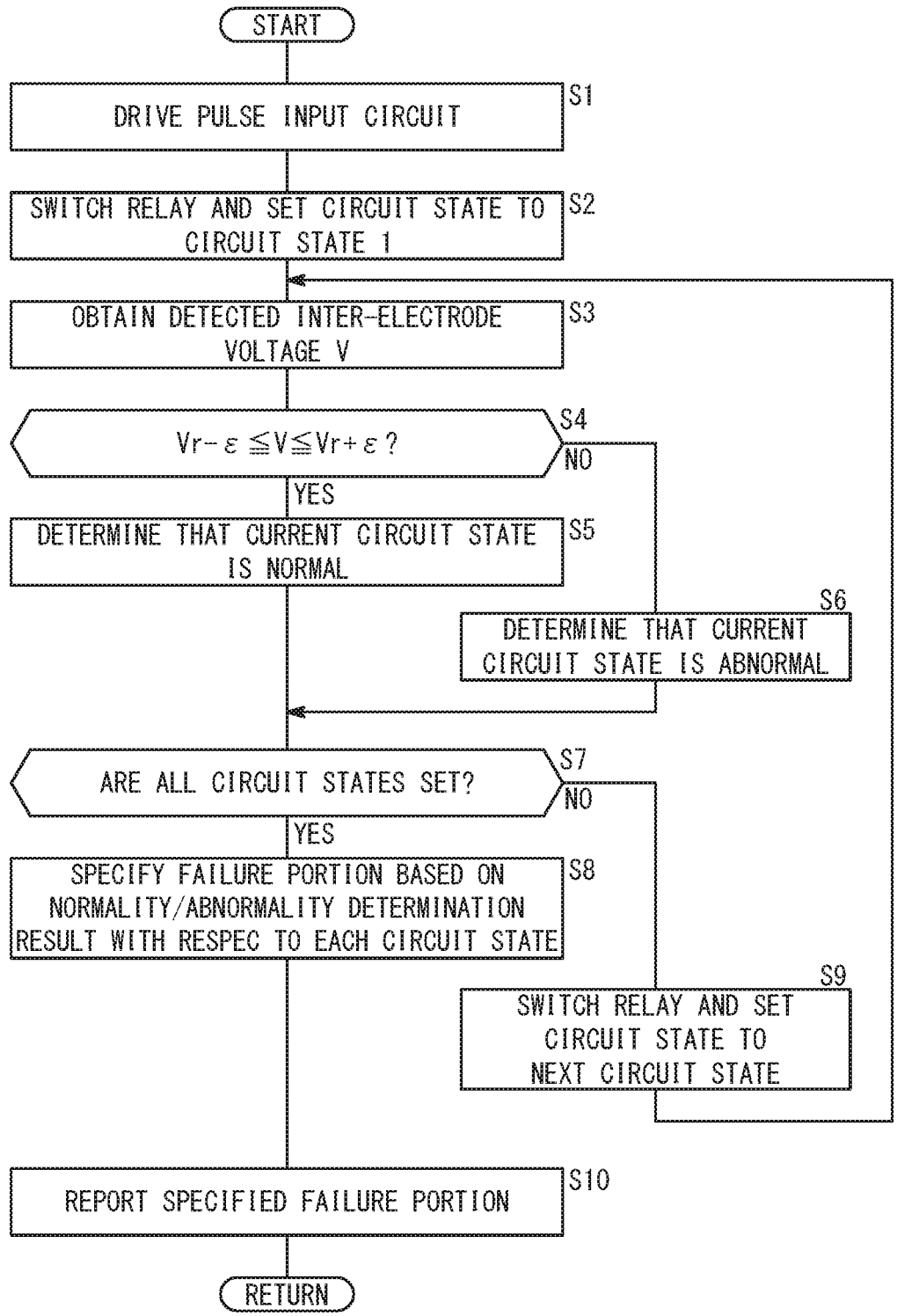
FIG. 5 is a flowchart showing an operation of the CNC shown in FIG. 3.

The operation of the CNC 18 (more specifically, the control unit 32) according to the second embodiment is the substantially same as that of the flowchart shown in FIG. 5. However, in the second embodiment, the circuit state of the machining power supply 12A cannot be switched unless the operator performs an operation in some cases. When, for example, the circuit state 2A is switched to the circuit state 3A, the connected connector CN (capacitor C) needs to be disconnected, and therefore the operator's operation is necessary. The operator's operation is also necessary to connect the capacitor.

Hence, when the circuit state of the machining power supply 12A is switched from the circuit state 2A to the circuit state 3A in step S8 in FIG. 5, the setting switching unit 40 switches on/off of the relay switches RL3, RL4, and outputs to the display control unit 46 a display signal for displaying an indication that encourages disconnection of the connector CN (capacitor C).

The display control unit 46 performs control based on the display signal to cause the display unit 30b to display the indication that encourages disconnection of the connector CN (capacitor C). Thus, a display screen of the display unit 30b displays messages such as "Disconnect the connector". The operator disconnects the connector and then pushes a resume button displayed on the display screen of the display unit 30b. When the resume button displayed on the display screen is pushed, the touch panel of the operation unit 30a detects this push, and outputs a detected signal to the control unit 32. When the resume button is pushed, the flow moves to step S3, and the state determining unit 42 obtains the inter-electrode voltage V detected by the voltage detecting unit 16 in the switched circuit state 3A.

When the circuit state of the machining power supply 12A is set to the circuit state 1A in step S2, similar to a case where the connector CN (capacitor C) is disconnected, the setting switching unit 40 switches on/off of the relay switches RL3, RL4, and outputs to the display control unit 46 a display signal for displaying an indication that encourages connection of the connector CN (capacitor C). When receiving the display signal, the display control unit 46 causes the display screen of the display unit 30b to display messages such as "Connect the connector". The operator connects the connector, and then pushes the resume button displayed on the display screen of the display unit 30b. When the resume button displayed on the display screen is pushed, the touch panel of the operation unit 30a detects this push, and outputs a detected signal to the control unit 32. When the resume button is pushed, the flow moves to step S3, and the state determining unit 42 obtains the inter-electrode voltage V detected by the voltage detecting unit 16 in the set circuit state 1A.

Third Embodiment

FIG. 9 is a configuration diagram of an electrical discharge machine 10B according to the third embodiment. The same components as those in the first embodiment will be assigned the same reference numerals, and only differences will be described. The electrical discharge machine 10B includes at least a machining power supply 12B, the electrode 14, the voltage detecting unit 16 and the CNC (numerical control device) 18.

The machining power supply 12B includes the power supply E, a pulse input circuit Aa, the two relay switches RL3, RL4, the two resistors R1, R2 and a diode D. The positive electrode of the power supply E is connected to the positive electrode-side input unit PI1 of the pulse input circuit Aa. The negative electrode of the power supply E is connected to the negative electrode-side input unit NI1 of the pulse input circuit Aa. The positive electrode-side output unit PO1 of the pulse input circuit Aa is connected to the electrode 14 via the relay switch RL3 and the resistor R1, and is connected to the electrode 14 via the relay switch RL4 and the resistor R2. That is, the relay switch RL3 and the resistor R1, and the relay switch RL4 and the resistor R2 are connected in parallel. The negative electrode-side output unit NO1 of the pulse input circuit Aa is connected to the target workpiece W. The pulse input circuit Aa and the electrode 14 are connected in the same way as that in the first embodiment.

The positive electrode-side output unit PO1 and the negative electrode-side output unit NO1 of the pulse input circuit Aa are connected via the diode D. The diode D is connected in parallel to the inter-electrode gap, and rectifies the inter-electrode voltage V. The diode D includes a cathode connected to the positive electrode-side output unit PO1 of the pulse input circuit Aa, and an anode connected to the negative electrode-side output unit NO1 of the pulse input circuit Aa. A connection point between the cathode of the diode D and the positive electrode-side output unit PO1 of the pulse input circuit Aa is positioned between the positive electrode-side output unit PO1 of the pulse input circuit Aa and the relay switches RL3, RL4. A contact point between the anode of the diode D and the negative electrode-side output unit NO1 of the pulse input circuit Aa is positioned between the negative electrode-side output unit NO1 of the pulse input circuit Aa and the target workpiece W.

In the third embodiment, unlike the pulse input circuit A, the pulse input circuit Aa can change a polarity state of a pulse voltage to be outputted (applied) based on an instruction value from the CNC 18 (setting switch unit 40). In this description, when the polarity state outputted (applied) by the pulse input circuit Aa is positive (+), a positive potential is given to the positive electrode-side output unit PO1 and a negative potential is given to the negative electrode-side output unit NO1. In a case of the negative (−) polarity state, the negative potential is given to the positive electrode-side output unit PO1, and the positive potential is given to the negative electrode-side output unit NO1.

In the third embodiment, the machining power supply 12B can have a plurality of different circuit states according to the polarity state of the pulse voltage outputted from the relay switches RL3, RL4 and the pulse input circuit Aa. That is, it is possible to form the plurality of circuit states by switching electrical connection of the relay switches RL3, RL4, and electrical setting (polarity state) of the pulse input circuit Aa, and set the circuit state of the machining power supply 12B to one circuit state of the plurality of circuit states. In the third embodiment, the machining power supply 12B can have four circuit states 1B to 4B. Consequently, it is possible to set the circuit state of the machining power supply 12B to one circuit state of the four circuit states 1B to 4B. In the third embodiment, the circuit state of the machining power supply 12B is switched in the following order: the circuit state 1B→the circuit state 2B→the circuit state 3B→the circuit state 4B.

FIG. 10 is a view showing a relationship between each of the four circuit states 1B to 4B, each of on/off states of the two relay switches RL3, RL4 and the polarity state of the pulse input circuit Aa. The circuit state of the machining power supply 12B in a case where the relay switch RL3 is on (CLOSE), the relay switch RL4 is off (OPEN) and the polarity state of the pulse input circuit Aa is positive (+) is defined as the circuit state 1B. That is, in the circuit state 1B, the pulse current from the pulse input circuit Aa flows to the inter-electrode gap via the resistor R1.

The circuit state of the machining power supply 12B in a case where the relay switch RL3 is off (OPEN), the relay switch RL4 is on (CLOSE) and the polarity state of the pulse input circuit Aa is positive (+) is defined as the circuit state 2B. That is, in the circuit state 2B, the pulse current from the pulse input circuit Aa flows to the inter-electrode gap via the resistor R2.

The circuit state of the machining power supply 12B in a case where the relay switch RL3 is on (CLOSE), the relay switch RL4 is off (OPEN) and the polarity state of the pulse input circuit Aa is negative (−) is defined as the circuit state 3B. That is, in the circuit state 3B, the pulse current from the pulse input circuit Aa flows to the diode D, and therefore the pulse current does not flow to the inter-electrode gap.

The circuit state of the machining power supply 12B in a case where the relay switch RL3 is off (OPEN), the relay switch RL4 is on (CLOSE) and the polarity state of the pulse input circuit Aa is negative (−) is defined as the circuit state 4B. That is, in the circuit state 4B, the pulse current from the pulse input circuit Aa flows to the diode D, and therefore the pulse current does not flow to the inter-electrode gap.

In the third embodiment, in the circuit states 3B, 4B, the pulse current flows to the diode D. Therefore, the pulse current does not flow to the inter-electrode gap, and the inter-electrode voltage V lowers (becomes close to 0 V). Hence, the predetermined range for determining whether the circuit states 3B, 4B are normal or abnormal is lower than the predetermined range used to determine whether or not the circuit states 1B, 2B are normal (the predetermined range (e.g., 75 V to 85 V) used to determine whether the circuit states 1 to 4, 1A to 4A described in each of the above embodiments are normal). For example, the predetermined range for determining whether or not the circuit states 3B, 4B are normal is set to a range from 0 V to 10 V.

FIG. 11 is a view showing a determination result with respect to each of the plurality of circuit states 1B to 4B provided by the state determining unit 42 when a short-circuiting failure occurs in the diode D. When the short-circuiting failure occurs in the diode D, even if the polarity state of the pulse input circuit Aa is positive, the pulse current flows to the diode D. Hence, the inter-electrode voltage V is outside the predetermined range (e.g., 75 V to 85 V). Hence, the state determining unit 42 determines that the circuit states 1B, 2B where the polarity state of the pulse input circuit Aa is positive are abnormal. Meanwhile, regardless of whether the short-circuiting failure occurs in the diode D or not, if the polarity state of the pulse input circuit Aa is negative, the pulse circuit flows to the diode D. Hence, in the circuit states 3B, 4B, even when the short-circuiting failure occurs in the diode D, the inter-electrode voltage V is in the predetermined range (e.g., 0 V to 10 V), and the state determining unit 42 determines that the circuit state is normal.

Hence, the table 34a of the CNC 18 stores a failure portion (diode D) and abnormality patterns (the pieces of information shown in FIG. 11) of the plurality of circuit states 1B to 4B associated with the failure portion (diode D).

The failure portion specifying unit 44 of the CNC 18 can specify a failure portion by comparing the abnormality patterns stored in the table 34a and the determination results for the plurality of circuit states 1B to 4B provided by state determining unit 42.

In this regard, determination as to whether or not each of the circuit states 1B to 4B is abnormal and specification of a failure portion in a case where a failure occurs in each of the resistors R1, R2 and the pulse input circuit Aa will be omitted yet can be performed in the same way as those in the first and second embodiments. The operation of the CNC 18 (more specifically, the control unit 32) according to the third embodiment is the substantially same as the flowchart shown in FIG. 5. When the circuit state set to the machining power supply 12B is the circuit states 3B, 4B, the predetermined range (e.g., 0 V to 10 V) used to determine whether or not the inter-electrode voltage V detected by the voltage detecting unit 16 is in a predetermined acceptable range in step S4 is set lower compared to the circuit states 1B, 2B (75 V to 85 V).

As described above, at least one electrical discharge machine 10 (or 10A, 10B) described in the first to third embodiment performs electrical discharge machining by applying the voltage to the inter-electrode gap formed between the electrode 14 and the target workpiece W and causing the current to flow. The electrical discharge machine 10 (or 10A, 10B) includes: the machining power supply 12 (or 12A, 12B) that has a plurality of different circuit states and can be set to one circuit state out of the plurality of circuit states by switching at least one of electrical connection and electrical setting; the state determining unit 42 that, when each of the plurality of circuit states is set as the circuit state of the machining power supply 12 (or 12A, 12B), determines whether or not the set circuit state is normal; the failure portion specifying unit 44 that specifies a failure portion of the machining power supply 12 (or 12A, 12B) based on the determination result with respect to each of the plurality of circuit states provided by the state determining unit 42; and the reporting unit (the display unit 30b or the sound output unit) that reports the failure portion specified by the failure portion specifying unit 44 to the operator. According to this configuration, it is possible to easily specify the failure portion of the machining power supply 12 (or 12A, 12B) while costs are reduced, and the operator can recognize the failure portion.

The electrical discharge machine 10 (or 10A, 10B) further includes the setting switching unit 40 that sequentially sets each of the plurality of circuit states as the circuit state of the machining power supply 12 (or 12A, 12B) by switching at least one of the electrical connection and the electrical setting. When the circuit state of the machining power supply 12 (or 12A, 12B) is switched to another state, the state determining unit 42 determines whether or not the switched circuit state is normal. Consequently, it is possible to determine whether each circuit state is normal or abnormal.

When the setting switching unit 40 switches the circuit state of the machining power supply 12A (or 12, 12B), if the operator needs to perform a switching operation, the reporting unit (the display unit 30B or the sound output unit) reports the switching operation to the operator. Consequently, even when the operator needs to perform the operation to switch the circuit state of the machining power supply 12A (or 12, 12B), it is possible to appropriately switch the circuit state of the machining power supply 12A (or 12, 12B).

The electrical discharge machine 10 (or 10A, 10B) further includes the voltage detecting unit 16 that detects the inter-electrode voltage V applied to the inter-electrode gap. When each of the plurality of circuit states is set as the circuit state of the machining power supply 12 (or 12A, 12B), the state determining unit 42 determines whether or not the circuit state is normal based on the inter-electrode voltage V detected by the voltage detecting unit 16. When the circuit state is normal, the voltage is normally applied to the inter-electrode gap. When the circuit state is abnormal, the voltage applied to the inter-electrode gap is remarkably different from a normal time. Consequently, by using the inter-electrode voltage V, it is possible to easily and precisely determine whether the circuit state is normal or abnormal.

When the inter-electrode voltage V detected by the voltage detecting unit 16 is not in the predetermined range determined in advance in accordance with the circuit state of the set machining power supply 12 (or 12A, 12B), the state determining unit 42 determines that the circuit state is abnormal. When the circuit state is normal, the voltage applied to the inter-electrode gap settles in the predetermined range. Consequently, by comparing the inter-electrode voltage V and the predetermined range, it is possible to easily and precisely determine whether the circuit state is normal or abnormal. Even when the inter-electrode voltage V varies depending on individual differences between electrical discharge machines 10, on materials of the electrode 14 and the target workpiece W, and on the like, it is possible to absorb these variations. That is, it is possible to prevent an influence of these variations on determination as to whether the circuit state is normal or abnormal.

The electrical discharge machine 10 (or 10A, 10B) further includes the table 34a that stores the abnormality patterns of the plurality of circuit states associated with the failure portions. The failure portion specifying unit 44 specifies the failure portion by comparing the abnormality patterns stored in the table 34a and the determination results for the plurality of circuit states obtained by the state determining unit 42. Consequently, it is possible to easily specify the failure portion and reduce costs.

While the invention has been particularly shown and described with a reference to a preferred embodiment, it will be understood that variations and modifications can be effected thereto by those skilled in the art without departing from the scope of the invention as defined by the appended claims.

What is claimed is:

1. An electrical discharge machine configured to perform electrical discharge machining by applying a voltage to an inter-electrode gap formed between an electrode and a target workpiece and causing a current to flow, the electrical discharge machine comprising:
 a machining power supply having a plurality of different circuit states, and configured to be set to one circuit state of the plurality of circuit states by switching at least one of an electrical connection or an electrical setting;
 a control unit comprising a storage medium in which a program is stored and a processor, wherein the processor is configured to:
  determine whether or not the set circuit state is normal in response to setting each of the plurality of circuit states as the circuit state of the machining power supply;
  specify a failure portion of the machining power supply based on a determination result with respect to each of the plurality of circuit states; and
  set each of the plurality of circuit states as the circuit state of the machining power supply sequentially by switching at least one of the electrical connection or the electrical setting; and
 a display configured to report the failure portion specified by the processor to an operator,
 wherein the processor is further configured to determine, in response to switching the circuit state of the machining power supply, whether or not the switched circuit state is normal.

2. The electrical discharge machine according to claim 1, wherein the display is further configured to report the switching operation to the operator in response to switching the circuit state set to the machining power supply and in response to the operator's needs to perform a switching operation.

3. The electrical discharge machine according to claim 2, further comprising a circuit configured to detect an inter-electrode voltage applied to the inter-electrode gap,
 wherein the processor is configured to determine, in response to setting each of the plurality of circuit states as the circuit state of the machining power supply, whether or not the circuit state is normal based on the inter-electrode voltage detected by the circuit.

4. The electrical discharge machine according to claim 3, wherein the processor is further configured to determine that the circuit state is abnormal in response to a determination that the inter-electrode voltage detected by the circuit is not in a predetermined range in advance in accordance with the set circuit state of the machining power supply.

5. The electrical discharge machine according to claim 1, further comprising
 a table configured to store the failure portion and abnormality patterns of the plurality of circuit states associated with the failure portion,
 wherein processor is configured to specify the failure portion by comparing the abnormality patterns stored in the table and the determination result with respect to each of the plurality of circuit states.

6. The electrical discharge machine according to claim 1, wherein the processor is configured to determine whether or not the switched circuit state is normal, based on a combination pattern of the determination result with respect to the plurality of circuit states set by sequentially switching at least one of the electrical connection or the electrical setting.

7. A failure determining method of an electrical discharge machine comprising a machining power supply having a plurality of different circuit states, and configured to be capable of being set to one circuit state of the plurality of circuit states by switching at least one of electrical connection and electrical setting, and the machine configured to perform electrical discharge machining by applying a voltage to an inter-electrode gap formed between an electrode and a target workpiece and to cause a current to flow, the failure determining method comprising:
 a state determining step of, when each of the plurality of circuit states is set as the circuit state of the machining power supply, determining whether or not the set circuit state is normal;
 a failure portion specifying step of specifying a failure portion of the machining power supply based on a determination result with respect to each of the plurality of circuit states provided in the state determining step;

a reporting step of reporting the failure portion specified in the failure portion specifying step to an operator; and a setting switching step of setting each of the plurality of circuit states as the circuit state of the machining power supply sequentially by switching at least one of the electrical connection and the electrical setting, wherein, in the state determining step, when the circuit state of the machining power supply is switched, whether or not the switched circuit state is normal is determined.

8. The failure determining method according to claim 7, wherein, in the reporting step, when the circuit state set to the machining power supply is switched in the setting switching step and when the operator needs to perform a switching operation, the switching operation is reported to the operator.

9. The failure determining method according to claim 7, further comprising a voltage detecting step of detecting an inter-electrode voltage applied to the inter-electrode gap, wherein, in the state determining step, when each of the plurality of circuit states is set as the circuit state of the machining power supply, whether or not the circuit state is normal is determined based on the inter-electrode voltage detected in the voltage detecting step.

10. The failure determining method according to claim 9, wherein, in the state determining step, when the inter-electrode voltage detected in the voltage detecting step is not in a predetermined range in advance in accordance with the set circuit state of the machining power supply, it is determined that the circuit state is abnormal.

11. The failure determining method according to claim 7, further comprising a storing step of storing, as a table, the failure portion and abnormality patterns of the plurality of circuit states associated with the failure portion, herein, in the failure portion specifying step, the failure portion is specified by comparing the abnormality patterns stored in the table and the determination result with respect to each of the plurality of circuit states provided in the state determining step.

* * * * *